United States Patent [19]
Murata

[11] Patent Number: 5,170,491
[45] Date of Patent: Dec. 8, 1992

[54] POWER SOURCE SWITCH CIRCUIT
[75] Inventor: Yukio Murata, Tokyo, Japan
[73] Assignee: NEC Corporation, Tokyo, Japan
[21] Appl. No.: 758,483
[22] Filed: Sep. 9, 1991

Related U.S. Application Data
[63] Continuation of Ser. No. 351,230, May 15, 1989, abandoned.

[30] Foreign Application Priority Data
May 13, 1988 [JP] Japan .................... 63-116622

[51] Int. Cl.$^5$ .............. H04B 1/38; H02G 3/00; H01H 3/26; H04M 11/00
[52] U.S. Cl. .................... 455/73; 455/89; 455/127; 455/343; 455/345; 307/10.1; 307/126; 307/140; 379/58
[58] Field of Search .............. 455/73, 89, 127, 343, 455/345, 346; 307/9, 10.1, 10.7, 126, 140; 379/58, 61-63, 354; 340/439

[56] References Cited
U.S. PATENT DOCUMENTS

| | | | |
|---|---|---|---|
| 4,538,074 | 8/1985 | Fraden | 307/126 |
| 4,649,286 | 3/1987 | Takeda et al. | 307/10.1 |
| 4,733,100 | 3/1988 | Nusairat et al. | 307/10.7 |
| 4,893,348 | 1/1990 | Andoh | 379/58 |

Primary Examiner—Reinhard J. Eisenzopf
Assistant Examiner—Andrew Faile
Attorney, Agent, or Firm—Sughrue, Mion, Zinn, Macpeak & Seas

[57] ABSTRACT

A power supply control circuit for use in an automobile telephone to which power is supplied in response to a power switch signal and to an ignition voltage. The power switch signal is generated by a power switch in a handset of the telephone. The ignition voltage is produced by turning on an ignition key. The power supply control circuit comprises an emergency switch which manually produces an emergency switch signal. An emergency switch monitor circuit monitors the state of the emergency switch and produces an emergency control signal when it receives the emergency switch signal. Upon the emergency control signal, an ignition voltage control circuit produces the ignition voltage regardless of the condition of the ignition key. Upon the emergency control signal, a power switch control circuit produces the power switch signal regardless of the condition of the power switch. By receiving the ignition voltage from the ignition voltage control circuit and the power switch signal from the power switch control circuit, the automobile telephone can quickly be turned on in an emergency situation.

14 Claims, 3 Drawing Sheets

POWER SOURCE SWITCH CIRCUIT

This is a continuation of application Ser. No. 07/351,230 filed May 15, 1989, abandoned.

BACKGROUND OF THE INVENTION

The present invention relates to a power supply control circuit and, more particularly, to a power supply control circuit for use in vehicle equipment, such as an automobile radio telephone.

A conventional power supply control circuit for use in an automobile radio telephone includes a power switch circuit which controls power supply to the telephone. To prevent an automobile battery from running out, the power switch circuit supplies power to the telephone in response not only to the depression of a power switch in the telephone but also to the turning-on of an ignition key, or switch. If the power supply is done in response only to the depression of the power switch, the automobile battery may run out.

In an emergency situation, however, the prior art power supply control circuit is not satisfactory. The user must operate at least two switches, i.e., the ignition switch and the power switch before dialing. Thus, he cannot quickly place a call in an emergency situation.

SUMMARY OF THE INVENTION

An object of the present invention is, therefore, to provide a generally improved power supply control circuit which eliminates the above-mentioned problems.

Another object of the present invention is to provide a power supply control circuit capable of turning vehicle equipment on in an emergency situation regardless of the positions of an ignition key and of a power switch.

Yet another object of the present invention is to provide a power supply control circuit which consumes less power in a waiting state.

According to the present invention, there is provided a power supply control circuit for use in an automobile telephone to which power is supplied in response to a power switch signal and to an ignition voltage. The power switch signal is generated by a power switch in a handset of the telephone. The ignition voltage is produced by turning on an ignition key. The power supply control circuit comprises an emergency switch which manually produces an emergency switch signal. An emergency switch monitor circuit monitors the state of the emergency switch and produces an emergency control signal when it receives the emergency switch signal. Upon the emergency control signal, an ignition voltage control circuit produces the ignition voltage regardless of the condition of the ignition key. Upon the emergency control signal, a power switch control circuit produces the power switch signal regardless of the condition of the power switch. By receiving the ignition voltage from the ignition voltage control circuit and the power switch signal from the power switch control circuit, the automobile telephone can quickly be turned on in an emergency situation.

BRIEF DESCRIPTION OF THE DRAWINGS

The above and other objects, features and advantages of the present invention will become more apparent from the following description referring to the accompanying drawings, in which.

DETAILED DESCRIPTION OF THE PREFERRED EMBODIMENTS

Figure 1:
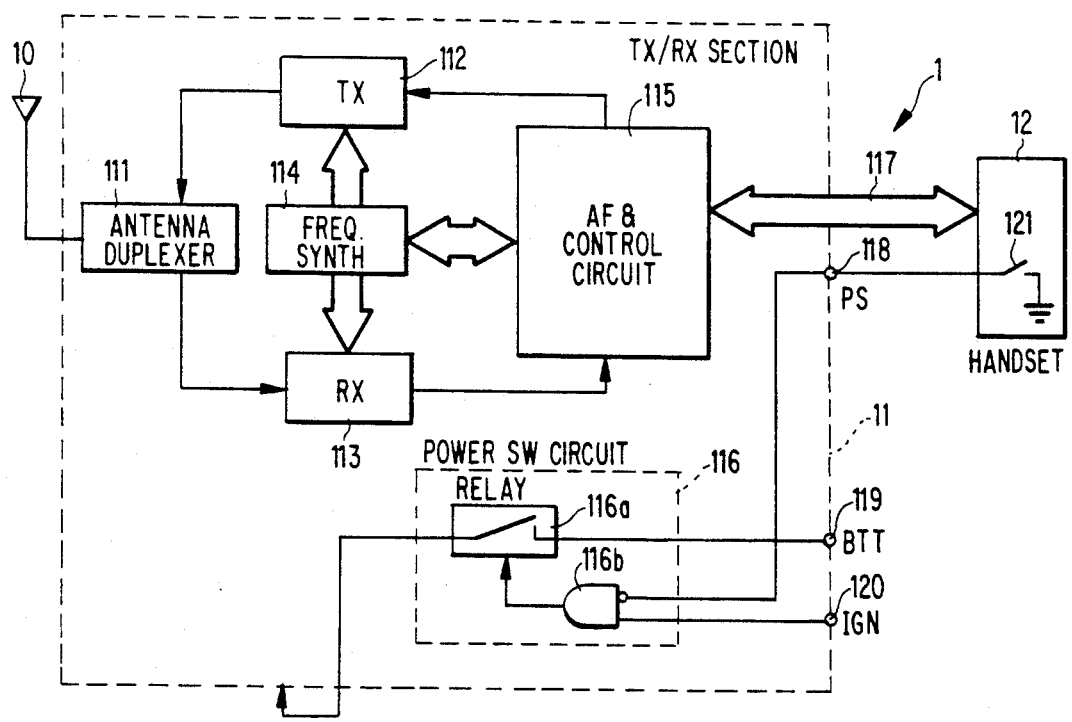
FIG. 1 is a block diagram showing a prior art mobile radio telephone including a power switch circuit.

In FIG. 1, a mobile telephone 1 is mounted on a vehicle and includes an antenna 10, a transmitter/receiver (TX/RX) section 11 and a handset 12. TX/RX section 11 comprises an antenna duplexer 111, a transmitter 112, a receiver 113, a frequency synthesizer 114, and an audio frequency (AF) and control circuit 115. The transmitter 112 modulates a radio frequency signal with an AF signal from the AF and control circuit 115 and transmits a modulated radio frequency signal through the antenna duplexer 111 and the antenna 10. The receiver 113 receives a radio frequency signal through the antenna duplexer 111 and the antenna 10, demodulates the received radio frequency signal to produce an AF signal and supplies it to the AF and control circuit 115. The frequency synthesizer 114 tunes the transmitter 112 and the receiver 113 to one of plural radio channels under the control of the control circuit 115. The AF and control circuit 115 exchanges AF signals between the transmitter 112 and the receiver 113, and the handset 12. The control circuit 115 interchanges various control signals with a base station (not shown) to control the mobile telephone 1. A data bus 117 connects the AF and control circuit 115 and the handset 12. The operation of the mobile telephone per se is well known in the art and therefore no further description thereof will be given in this specification.

The TX/RX section 11 further comprises a power switch circuit 116 which includes a relay 116a and an AND gate 116b. The relay 116a is connected with a battery (BTT) terminal 119 which in turn is directly connected with a vehicle battery. When the relay 116a is closed, power from the battery is supplied to the TX/RX section 11 therethrough.

An inverted input of AND gate 116b is connected with a power switch 121 through a power switch (PS) terminal 118. The other input of AND gate 116b is connected with an ignition key (not shown) through an ignition (IGN) terminal 120. If the ignition key is turned on, an ignition voltage of, for example, 12 volts is applied to IGN terminal 120. In this condition, if the power switch 121 is closed, AND gate 116b produces a high-level signal to cause the relay 116a to be closed. Otherwise, AND gate 116b produces a low-level signal to cause the relay 116a to be open.

Figure 2:
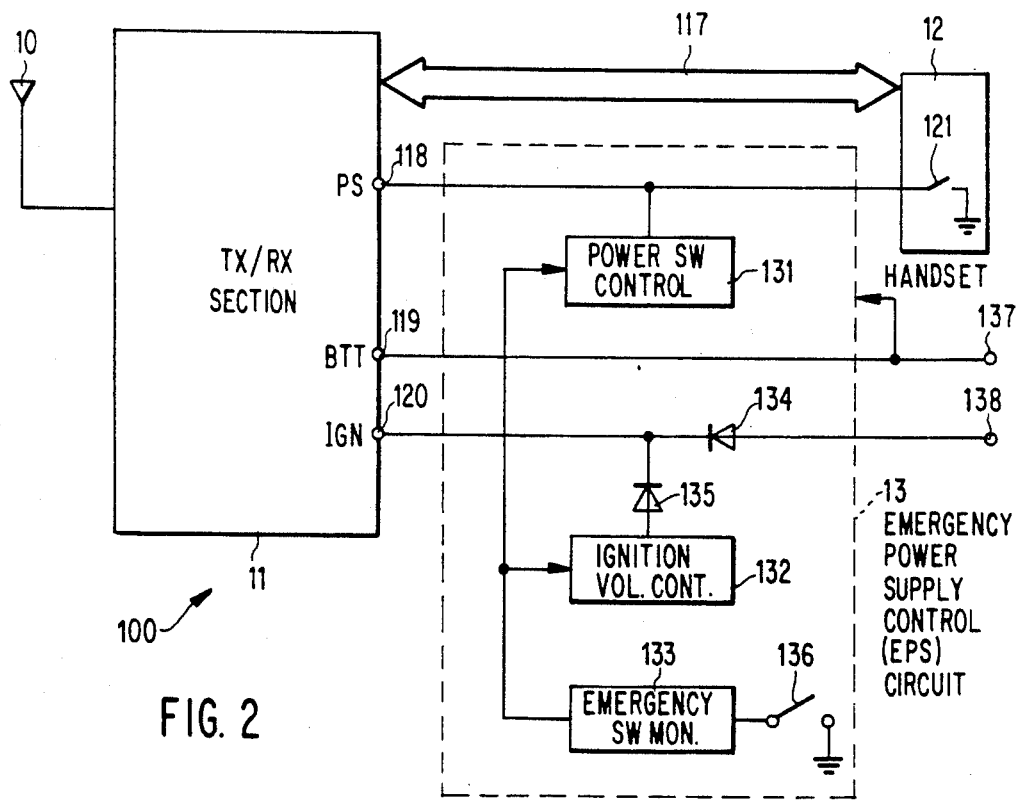
FIG. 2 is a block diagram showing a mobile radio telephone including a power supply control circuit in accordance with the present invention.

In FIG. 2, the same elements as those in FIG. 1 are designated by the same reference numerals as those in FIG. 1. A mobile radio telephone 100 is mounted on a vehicle having a battery. The telephone 100 comprises an emergency power supply control (EPS) circuit 13 which includes a power switch control circuit 131, an ignition voltage control circuit 132, an emergency switch monitor circuit 133, diodes 134 and 135 and an emergency switch 136. The emergency switch 136 may be composed of a non-lock type push-button. The power switch control circuit 132 is connected with the PS terminal 118, the power switch 121 and the emergency switch monitor circuit 133. The ignition voltage control circuit 132 is connected with the anode of diode 135 and the emergency switch monitor circuit 133. The cathodes of diodes 134 and 135 are connected with each other and with the IGN terminal 120. The anode of diode 134 is connected with the ignition key through a terminal 138. The emergency switch 136 is connected between the emergency switch monitor circuit 133 and ground. Power is supplied to the EPS circuit 13 through a terminal 137 with which the vehicle battery and the BTT terminal 119 are connected.

In operation, if the emergency switch 136 is open, power supply to the TX/RX section 11 is to be done in the same manner as discussed in reference to FIG. 1. Only when the ignition key is turned on and the power switch 121 is closed, is power supplied from the battery to TX/RX section 11 through the BTT terminal 119 and the terminal 137.

When the emergency switch 136 is closed to produce an emergency switch signal, the emergency switch monitor switch 133 detects the emergency switch signal and thus produces an emergency control signal. The emergency control signal is applied to the ignition voltage control circuit 132 and to the power switch control circuit 131. Upon the control signal, the ignition voltage control circuit 132 supplies IGN terminal 120 through the diode 135 with the same voltage as the ignition voltage which is applied to the terminal 138 when the ignition key is turned on. In response to the emergency control signal, the power switch control circuit 131 makes PS terminal 118 be grounded as if the power switch 121 were closed. Thus, if the emergency switch 136 is closed, power is applied to TX/RX section 11 irrespective of the states of the power switch 121 and of the ignition key.

Figure 3:
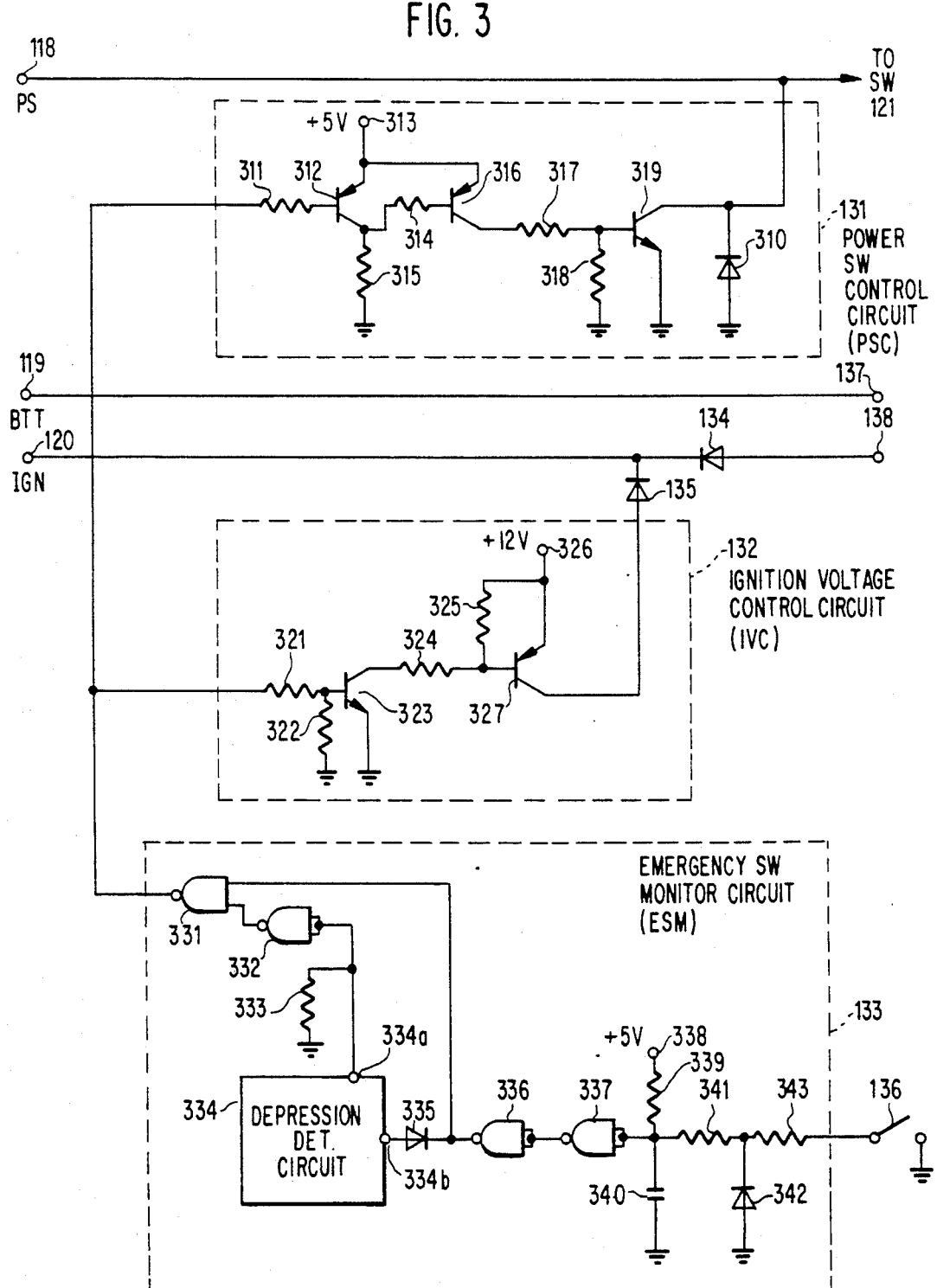
FIG. 3 shows a schematic circuit diagram of the power supply control circuit of FIG. 2.

In FIG. 3, the same elements as those in FIGS. 1 and 2 are designated by the same reference numerals as those in FIGS. 1 and 2. The power switch control circuit 131 includes a PNP transistor 312 whose base, emitter and collector are connected with one end of a resistor 311, a terminal 313 and one end of a resistor 315, respectively. The other end of resistor 315 is grounded. The terminal 313 is always applied with a five-volt voltage from the vehicle battery through a voltage stabilizer (not shown). The collector of transistor 312 is also connected with the base of a PNP transistor 316 through a resistor 314. The emitters of transistors 312 and 316 are connected with each other. The collector of transistor 316 is connected with the base of an NPN transistor 319 through a resistor. The base of transistor 319 is also connected with ground through a resistor 318. The emitter of transistor 319 is grounded and the collector of the same is connected with the cathode of a diode 310 and with the power switch 121. The anode of diode 310 is grounded.

The ignition voltage control circuit 132 includes an NPN transistor 323 whose base is connected with one end of a resistor 321 and grounded through a resistor 322. The emitter of transistor 323 is grounded and the collector of the same is connected with the base of a PNP transistor 327 through a resistor 324. The base and emitter of transistor 327 are connected with each other through a resistor 325. The emitter of transistor 327 is also connected with a terminal 326 to which a twelve-volt voltage is applied from the vehicle battery. The collector of transistor 327 is connected with the anode of diode 135.

In the emergency switch monitor circuit 133, one end of a resistor 343 is connected with the emergency switch 136. The other end of resistor 343 is connected with one end of a resistor 341 and with the cathode of a diode 342. The anode of diode 342 is grounded. The other end of resistor 341 is connected with one end of a resistor 339, the inputs of an inverter 337 and one end of a capacitor 340. The other end of resistor 339 is connected with a terminal 338 to which a five-volt voltage is applied from the vehicle battery through the voltage stabilizer. The other end of capacitor 340 is grounded.

The output of inverter 337 is connected with the inputs of an inverter 336. The output of inverter 336 is connected with the cathode of a diode 335 and one input of a NAND gate 331. The anode of diode 335 is connected with a terminal 334b of a depression detection circuit 334. The circuit 334 has another terminal 334a connected with the inputs of an inverter 332 and with one end of a resistor 333. The other end of resistor 333 is grounded. The output of inverter 332 is connected with the other input of NAND gate 311. The output of NAND gate 331 is connected with the resistors 311 and 321. The depression detection circuit 334 may be comprised of a microprocessor.

In operation, when the emergency switch 136 is open, a high-voltage signal is applied to the inverter 337 from the terminal 338. In response, the inverter 337 outputs a low-level signal and supplies it to the inverter 336 which in turn outputs a high-level signal. The high-level signal is applied to the terminal 334b through the diode 335. Upon the high-level signal, the circuit 334 produces a low-level signal at the terminal 334a (see FIG. 4).

Figure 4:
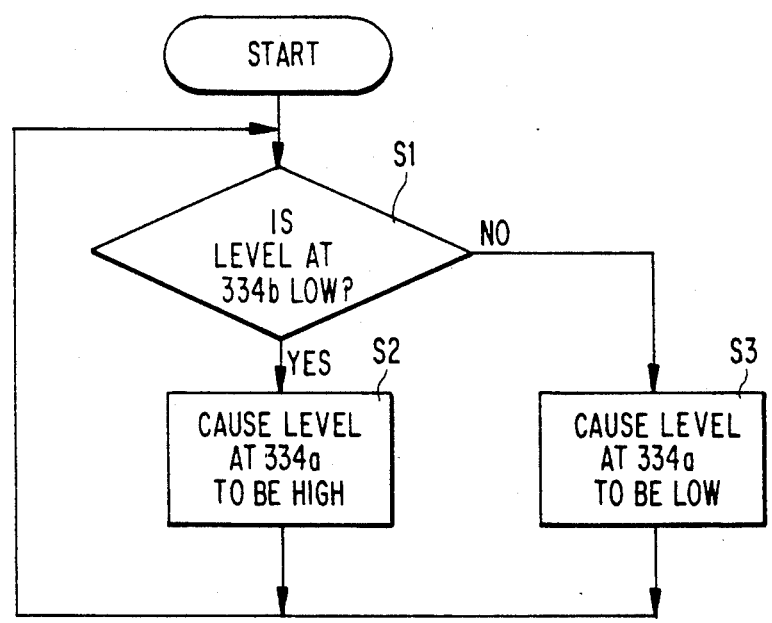
FIG. 4 is a flow chart showing the operation of a depression detection circuit in FIG. 3.

Referring temporarily to FIG. 4, the circuit 334 (FIG. 3) checks at step S1 whether the level of signal at the terminal 334b is high or low. If high, the circuit 334 causes a level at the terminal 334a to be low at step S3. If low, the circuit 334 causes the level at the terminal 334a to be high at step S2. Steps S2 and S3 return to step S1.

Returning to FIG. 3, the low-level signal at the terminal 334a is applied to the inverter 332 which produces a high-level signal and supplies it to one input of NAND gate 331. The high-level signal from the inverter 336 is also applied to the other input of NAND gate 331. In response to the two high-level signals, NAND gate 331 produces a low-level signal and supplies it to the power switch control circuit 131 and to the ignition voltage control circuit 132. It is to be noted that the inverters 336 and 337 are used for impedance matching and the resistor 333 is used for stabilizing the output level of the circuit 334.

The low-level signal makes the transistor 312 nonconductive, which makes the transistor 316 nonconductive. This results in cutting off the transistor 319. The low-level signal also makes the transistor 323 nonconductive, which makes the transistor 327 nonconductive. Thus, when the emergency switch 136 is open, the power switch control circuit 131 and the ignition voltage control circuit 132 do not affect the condition of the PS terminal 118 and IGN terminal 120, respectively. Also, when the emergency switch 136 is open, less power will be consumed because all the transistors 312, 319, 323 and 327 are turned off.

When the emergency switch 136 is closed, an emergency switch signal; viz., the grounded signal is applied to the inverter 337 through an integrator made up of the resistors 341 and 343 and the capacitor 340, which integrator is inserted to depress the chattering caused by the depression of emergency switch 136. Upon the emergency switch signal, the inverter 337 produces a high-level signal to cause the inverter 336 to output a low-level signal. In response to the low-level signal, the circuit 334 supplies a high-level signal through the terminal 334a to the inverter 332 which in turn supplies a low-level signal to one of inputs of NAND agate 331. NAND gate 331 also receives the low-level signal on the other input thereof from the inverter 336 and thus outputs a high-level signal as the emergency control signal.

It should be noted that the diode 342 prevents a line between the switch 136 and the monitor circuit 133 from storing a negative charge thereon. This line is practically five centimeters in length.

Responsive to the emergency control signal of high-level from NAND gate 331, the transistor 312 turns on, which renders the transistor 316 conductive. As a result, the transistor 319 is turned on to ground the PS terminal 118 as it would be if power switch 121 is closed. It is to be noted that the diode 310 has the same function as the diode 342, i.e., preventing a line between the circuit 131 and the PS terminal 118 from storing a negative charge thereon.

Responsive to the high-level signal from NAND gate 331, the transistor 323 also turns on, which renders the transistor 327 conductive. As a result, a voltage of 12 volts is applied to the IGN terminal 120 through the diode 135 just as it would be had the ignition key been turned on. Thus, when the emergency switch 136 is closed, the PS terminal 118 is grounded and the ignition voltage (120) is applied to the IGN terminal 120, irrespective of the states of the power switch 121 and the ignition key. By simply depressing the emergency switch 136, therefore, the user can quickly turn the mobile telephone on to place a call in an emergency situation.

What is claimed is:

1. A mobile telephone comprising:
    transmitter/receiver means;
    power supply means for supplying power to said transmitter/receiver means in response to an ignition voltage and to a power switch signal;
    emergency means for producing an emergency control signal;
    power switch control means responsive to said emergency control signal for producing said power switch signal and supplying it to said power supply means; and
    ignition voltage control means responsive to said emergency control signal for producing said ignition voltage and supplying it to said power supply means; wherein said power switch control means comprises: first resistor means one end of which is connected with the output of said emergency means; first transistor means whose base and emitter are connected with the other end of said first resistor means and with a terminal supplied with a predetermined voltage, respectively; second resistor means connected between the collector of said first transistor means and ground; third resistor means one end of which is connected with the collector of said first transistor means; second transistor means whose base and emitter are connected with the other end of said third resistor means and with the emitter of said first transistor means, respectively; fourth resistor means one end of which is connected with the collector of said second transistor; fifth resistor means connected between the other end of said fourth resistor means and ground; third transistor means whose base, emitter and collector are connected with said other end of said fourth resistor means, ground and the output of said power switch control means, respectively; and diode means whose anode and cathode are connected with ground and the collector of said third transistor means, respectively.

2. A mobile telephone as claimed in claim 1, wherein said predetermined voltage is five volts.

3. A mobile telephone as claimed in claim 1, wherein each of said first and second transistor means comprises a PNP transistor and wherein said third transistor means comprises an NPN transistor.

4. A mobile telephone comprising:
    transmitter/receiver means;
    power supply means for supplying power to said transmitter/receiver means in response to an ignition voltage and to a power switch signal;
    emergency means for producing an emergency control signal;
    power switch control means responsive to said emergency control signal for producing said power switch signal and supplying it to said power supply means; and
    ignition voltage control means responsive to said emergency control signal for producing said ignition voltage and supplying it to said power supply means; wherein said ignition voltage control means comprises: first resistor means one end of which is connected with the output of said emergency means; second resistor means connected between the other end of said first resistor means and ground; first transistor means whose base and emitter are connected with said other end of said first resistor means and ground, respectively; third resistor means one end of which is connected with the collector of said first transistor means; second transistor means whose base, collector and emitter are connected with the other end of said third resistor means, the output of said ignition voltage control means and a terminal supplied with a predetermined voltage, respectively; and fourth resistor means connected between the base and emitter of said second transistor means.

5. A mobile telephone as claimed in claim 4, wherein said predetermined voltage is 12 volts.

6. A mobile telephone as claimed in claim 4, wherein said first transistor means comprises an NPN transistor and wherein said second transistor means comprises a PNP transistor.

7. A mobile telephone comprising:
    transmitter/receiver means;
    power supply means for supplying power to said transmitter/receiver means in response to an ignition voltage and to a power switch signal;
    emergency means for producing an emergency control signal;
    power switch control means responsive to said emergency control signal for producing said power switch signal and supplying it to said power supply means; and
    ignition voltage control means responsive to said emergency control signal for producing said ignition voltage and supplying it to said power supply means;

wherein said emergency means comprises: emergency switch means for manually producing an emergency switch signal; and emergency switch monitor means responsive to said emergency switch signal for producing said emergency control signal, said emergency switch monitor means comprises: first resistor means one end of which is connected with said emergency switch means; first diode means whose cathode and anode are connected with the other end of said first resistor and ground, respectively; second resistor means one end of which is connected with said cathode; third resistor means connected between the other end of said second resistor means and a terminal supplied with a predetermined voltage; capacitor means connected between said other end of said second resistor means and ground; first inverter means whose input is connected with said other end of said second resistor means; second inverter means whose input is connected with the output of said first inverter means; second diode means whose cathode is connected with the output of said second inverter means; depression detection means having first and second terminals, said first terminal being connected with the anode of said second diode, said depression detection means producing a high-level signal when a signal at said first terminal is low, and producing a low-level signal when a signal at said first terminal is high, said high- and low-level signals being supplied to said second terminal; fourth resistor means connected between said second terminal and ground; third inverter means whose input is connected with said second terminal; and NAND gate means whose two inputs are respectively connected with the outputs of said second and third inverter means and whose output is connected with the output of said emergency means to output said emergency control signal.

8. A mobile telephone as claimed in claim 7, wherein said predetermined voltage is five volts.

9. A vehicle electrical apparatus comprising:
battery means;
power supply means, having a power switch terminal, a battery terminal and an ignition terminal, for applying power from said battery means to said apparatus in response to an ingnition voltage and to a power switch signal, said power switch, battery and ignition terminals being supplied with said power switch signal, ignition voltage and power, respectively;
power switch means for manually producing said power switch signal and supplying it to said power supply means;
ignition key means for producing said ignition voltage and supplying it to said ignition terminal;
emergency means for producing an emergency control signal;
power switch control means connected with said power switch means and responsive to said emergency control signal for producing said power switch signal and supplying it to said power switch terminal;
ignition voltage control means connected with said ignition key means and responsive to said emergency control signal for producing said ignition voltage and supplying it to said ignition terminal;
first diode means whose anode and cathode are connected with said ignition key means and said ignition terminal, respectively; and
second diode means whose anode and cathode are connected with the output of said ignition voltage control means and the cathode of said first diode means, respectively.

10. A vehicle electrical apparatus comprising:
ignition means for producing a first ignition signal;
switch means for producing a control signal;
ignition control means connected to said ignition means and responsive to said control signal for producing a second ignition signal;
power supply means, having a battery terminal and an ignition terminal, for supplying power from a vehicle battery to said apparatus in response to one of said first and second ignition signals, said battery and ignition terminals being supplied with said power and one of said first and second ignition signals, respectively;
first diode means connected between said ignition means and said ignition terminal for preventing the reverse current therebetween; and
second diode means connected between said ignition control means and said ignition terminals for preventing the reverse current therebetween.

11. An apparatus as claimed in claim 10, wherein said first diode means comprises a first diode whose anode and cathode are connected with said ignition means and said ignition terminal, respectively, and wherein said second diode means comprises a second diode whose anode and cathode are connected with the output of said ignition control means and the cathode of said first diode, respectively.

12. An apparatus as claimed in claim 10, wherein said power supply means further comprises a power switch terminal, said apparatus further comprising: power switch means for producing a first power switch signal; and power switch control means connected to said power switch means and responsive to said control signal for producing a second power switch signal,
wherein said power supply means comprises means for supplying power from said vehicle battery to said apparatus in response to one of said first and second ignition signals and to one of said first and second power switch signals.

13. An apparatus as claimed in claim 10, wherein said switch means comprises manual switch means for manually producing said control signal.

14. An apparatus as claimed in claim 13, wherein said manual switch means comprises a non-lock type pushbutton.

* * * * *